United States Patent [19]

Knäble et al.

[11] Patent Number: 4,532,276

[45] Date of Patent: Jul. 30, 1985

[54] WRITING FLUID

[76] Inventors: Thomas Knäble, Steinthalstr. 21, 8500 Nürnberg; Lydia Söllner, Lindenstr. 8, 7981 Grünkraut; Richard Wethey, Kölner Strasse 20, 8500 Nürnberg; Ilse Otte, Renzenhofer Strasse 18, 8505 Röthenbach, all of Fed. Rep. of Germany

[21] Appl. No.: 582,454

[22] Filed: Feb. 22, 1984

[30] Foreign Application Priority Data

Feb. 26, 1983 [DE] Fed. Rep. of Germany ....... 3306786

[51] Int. Cl.$^3$ ................... C09D 11/14; C09D 11/04
[52] U.S. Cl. ....................................... 524/18; 524/25; 524/198; 523/161
[58] Field of Search ................ 524/18, 19, 25, 198; 106/20, 22, 23; 523/160, 161

[56] References Cited

U.S. PATENT DOCUMENTS

| | | | |
|---|---|---|---|
| 3,961,965 | 6/1976 | Zwahlen | 106/22 |
| 4,243,694 | 1/1981 | Mansukhani | 106/21 |
| 4,304,601 | 12/1981 | Sharp | 106/22 |
| 4,402,262 | 9/1983 | Handforth | 524/522 |

*Primary Examiner*—John Kight
*Assistant Examiner*—Nathan M. Nutter

[57] ABSTRACT

A writing or recording fluid on an aqueous basis, such as an ink, comprising coloring agents, binder, water and, optionally, other additives. The invention discloses polyurethane, preferably a linear polyurethane in aqueous dispersions as the binder.

12 Claims, No Drawings

WRITING FLUID

BACKGROUND OF THE INVENTION

1. Field of the Invention

The invention generally relates to writing or recording fluids on an aqueous basis and is particularly directed to writing or drawing ink which is essentially composed of coloring agents, binder, water and, in some instances, other additives.

2. Description of the Prior Art

German Offenlegungsschrift No. 2,136,055 discloses an ink or graphic dye suitable for inscribing film carriers by means of jet printers. The binder for the ink or dye as disclosed in this prior art publication is a resin of styrene and maleic acid anhydride or a carboxylated polyvinyl acetate and/or polyacrylic resin. The Offenlegungsschrift teaches that the primary reason for using such a binder is to facilitate contactless, damage-free inscribing of the carrier, particularly a film carrier or photographic negative.

According to German Auslegeschrift No. 2,837,158, drawing inks usually contain shellac or shellac-borax mixtures as binder. The Auslegeschrift proposes to replace these binders by polyvinyl pyrrolidone (PVP). In this manner, it is suggested that the application of the writing or drawing is obtained in such a state or form that it can be readily corrected.

Previously, drawing inks were predominantly produced with gum arabic, glue solution or blood serum as binder (see Roempp's Chemie Lexikon (Chemical Encyclopedia), 7th Edition, 1977, page 3710, left column).

German Offenlegungsschrift No. 2,132,324 discloses a writing or drawing ink of low viscosity, which contains polyvinyl pyrrolidone and a polyethylene oxide as water-soluble resin, in order to avoid spraying or blotting especially when such an ink is used in a recording mechanism or inking system and the recording element is moved rapidly in order to shift its position.

Within certain limits, the known writing fluids fulfill their particular, designated objectives. Generally, however, they have a high heat sensitivity, offer a limited possibility for using other solvents, have a relatively high viscosity and therefore a lower operating speed, tend to become brittle or have inadequate adhesion to the script carrier, especially to transparent papers or sheets, or are—especially if they contain natural resins or other natural products—susceptible to aging, so that the use of additional preservatives is required.

SUMMARY OF THE INVENTION

It is, therefore, an object of the present invention to provide a writing or recording agent, particularly a writing or drawing ink, which does not have the aforementioned disadvantages and drawbacks of known writing or recording agents.

It is a primary object of the invention to provide a writing or drawing ink which exhibits superior thermal stability, has a long shelf life, renders possible high operating speeds and which produces writings and drawings which are strong in color and exhibit excellent adhesion to the carrier even if the ink is used in high speed printers and recording devices.

The above objects are obtained in a particularly simple and unexpected manner by using a binder in the form of polyurethane.

In a preferred embodiment of the invention, the polyurethane binder is a linear polyurethane.

While it has previously been proposed to use certain polyurethane dispersions for coating purposes, the use of polyurethane as an ink binder has not previously been suggested.

By using polyurethane, preferably linear polyurethane in dispersed form as binder in accordance with the invention, the ink becomes largely resistant to aging and insensitive to heat, even without the addition of preservatives. Besides a good surface gloss, the downstrokes of such writing and recording agents exhibit excellent adhesion to the carrier even if the latter is in the form of sheets and foil and similar roughened or smooth carriers. Moreover, the downstrokes do not become brittle and produce contours with sharp edges. Moreover, the inventive inks exhibit excellent compatibility in respect to many chemical substances. The compatibility is particularly pronounced with regard to lower or higher aliphatic and/or aromatic alcohols, ketones and esters, soluble, preferably acidic, dyes, and glycols as well as proteins. Furthermore, the use of the inventive binder also permits the addition of larger amounts of pigments or dyes, without thereby impairing the good adhesion.

The use of aqueous, plasticizer-free polyurethane dispersions, with a solids content of 30 to 60 and, preferably, of 35 to 50 weight percent and a viscosity of 10 to 200 cP and, preferably, of 30 to 100 cP at 20° C. (cP=mPas) has proven to be particularly advantageous.

It is equally advantageous if the coloring agent, insofar as coloring pigments, including carbon black are to be used, is present as a dispersion, for example, as a color paste or as a pigment paste. Particularly suitable pigment pastes should contain 20 to 60 and, preferably, 25 to 50 weight percent of pigments and may contain up to 20 weight percent of surfactants, especially nonionic surfactants, as well as small amounts of preservative, if desired. The use of preservatives is, however, unnecessary.

Depending upon the desired viscosity of the writing or recording agent, glycols and/or polysaccharides or other thickening agents can be added for the appropriate adjustment.

As further additives, the writing or recording agent may also contain proteins, especially sodium caseinate, aliphatic and/or aromatic alcohols, ketones and/or esters, as well as, if desired, wetting agents, UV absorbers and possibly supplementary, preferably acidic, coloring agents in soluble form.

The finished writing or recording liquid advantageously comprises:

10 to 40 weight percent of binder, preferably a polyurethane dispersion with 30 to 60 weight percent of solids and a viscosity of 10 to 200 cP at 20° C., 2 to 40 weight percent of coloring agent, preferably a pigment paste with a pigment content of 20 to 60%, 25 to 70 weight percent of water, and up to 35 weight percent of other additives, such as glycols, polysaccharides, proteins, alcohols, ketones, esters, wetting agents and UV absorbers and should contain in the finished mixture:

3 to 30 weight percent of polyurethane, 2 to 30 weight percent of coloring agent, 30 to 90 weight percent of water, 0 to 15 weight percent of alcohol, ketones and/or esters, as well as 0 to 20 weight percent of proteins, glycols, UV absorbers, wetting agents and/or other additives.

If soluble coloring agents are used exclusively or in addition, attention should be paid to ensuring that the solvents, required for the coloring agent, are also compatible with the remaining components. Because polyurethane is proposed as binder, the number of available coloring agents has also increased for the reason that polyurethane exhibits very good compatibility with other chemical substances and especially with a large number of solvents.

If it appears to be appropriate for particular applications, additional binders can also be added to the polyurethane, provided that they are compatible with it.

The inventive writing or recording agents can advantageously be used in capillary recording devices, but also when capillary channels with fibre tips are used, provided that these wicks do not exhibit too high a filtration effect. The inks are suitable for manual as well as for mechanical applications, for example, in numerically controlled drawing equipment.

The invention is described in greater detail in the following by means of a few examples. With the exception of Example 1, which relates to the finished writing or recording fluid, the quantitive data is given here in weight percent of the components of the mixture, used for preparing the writing or recording fluid.

As polyurethane resin: linear polyurethane or polyester urethane, preferably in the form of a dispersion;
As other binders: polyvinyl pyrrolidone, polyvinyl acetate, polyacrylate, polystyrene, acrylonitrilebutadiene-styrene copolymer, polyethylene oxide, shellac or other artificial or natural resins;
As color pigment paste: organic red or blue pigment paste, rutile dispersion, carbon black pastes, etc.;
As acid dye: acid yellow, black, red, etc;
As soluble dye: nigrosin dye, methyl violet base, rhodamine base, malachite green (CI No. 4200B), auramine base;
As lower aliphatic alcohols: i-propanol, ethanol;
As ketone: methyl ethyl ketone;
As Ester: ethyl acetate;
As higher aliphatic and aromatic alcohol: heptanol, cyclohexanol;
As thickener: for instance, polysaccharides, glycols;
As glycols or glycol ether: phenyldiglycol (phenoxyethanol), hexanediol.

Example 1 gives the preferred limiting values of the proportions of the individual components of the finished writing or recording fluid.

Example 2 describes the preferred limiting values of the components of the mixture for preparing the writing or recording fluid.

Examples 3 to 15 are specific embodiments of ink compositions.

The polyurethane dispersions may have different solids contents, different compositions or different viscosities and can be used in admixture with one another and/or with other binders. The inventive polyurethane

| Komponente | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Polyurethan | | | — | — | — | — | — | — | — | — | — | — | 10 | — | — |
| Polyurethan-Disp. (40% PU, 30 cP b.20° C.) | 3–30 | | 30 | 25 | — | — | — | 20 | — | 17 | — | 23 | 12 | 8 | 24 |
| Polyurethan-Disp. (40% PU, 100 cP b.20° C.) | | 10–40 | — | — | 20 | 22 | 15 | 7 | 15 | — | 10 | — | — | 13 | — |
| sontige Bindmittel | | | — | — | — | — | — | — | — | — | — | — | — | — | 15 |
| Farbstoffe (loslich) | | | — | — | — | — | — | — | 7 | — | — | 1 | 3 | — |
| Farbstoffe (sauer) | | | — | — | — | — | — | 8 | — | — | — | — | — | 2 |
| Farbpigmentteig | 2–30 | 2–40 | — | — | — | — | 25 | — | 23 | — | 25 | 17 | 5 | — |
| Russpigmentteig | | | 35 | 30 | 15 | 18 | — | 35 | 10 | — | 20 | — | — | — | — |
| niedrige aliphat. Alkohole bis C4 | | | — | 0,5 | 0,5 | 0,2 | — | — | — | 4 | — | — | 10 | — | 5 |
| Keton | 0–15 | | — | — | — | — | — | — | — | — | 0,5 | — | — | — | — |
| Ester | | | — | — | — | — | — | — | — | — | — | 0,4 | — | — | — |
| Hohere aliphatische Alkohole | | 0–35 | — | — | — | 2.3 | — | — | — | — | 1 | — | 5 | — | 2 |
| Verdickungsmittel | | | — | — | 0,4 | — | — | — | — | — | — | — | — | — | — |
| Proteine, Na-Caseinat | | | — | — | — | — | — | — | — | — | 0,5 | — | — | 1 | — |
| Glykole | 0–20 | | — | — | — | — | 5 | 1 | — | 3 | — | 1,6 | 20 | 18 | 2 |
| Netzmittel | | | — | — | — | 0,2 | — | — | — | — | — | — | — | 2 | 1 |
| UV-Absorber | | | — | — | — | — | — | — | 0,2 | — | — | — | — | — | — |
| Wasser | 30–90 | 25–70 | 35 | 44,5 | 64,1 | 57,3 | 55 | 37 | 66,8 | 46 | 68 | 50 | 25 | 50 | 49 |

Key for Table on Preceding Page
Komponente = Component
Polyurethan-Disp. = Polyurethane dispersion
sonstige Bindemittel = Other binders
Farbstoffe (loslich) = Coloring agents (soluble)
Farbstoffe (sauer) = Dyes (acidic)
Farbpigmentteig = Coloring pigment paste
Russpigmentteig = Carbon black pigment paste
niedrige aliphat. Alkohole bis C4 = Lower aliphatic alcohols up to C4
Keton = Ketone
Ester = Ester
Hohere aliphatische Alkohole = Higher aliphatic alcohols
Verdickungsmittel = Thickeners
Proteine = Proteins
Na Caseinat = Sodium caseinate
Glykole = Glycols
Netzmittel = Wetting agents
UV Absorber = UV absorber
Wasser = Water Insofar as they have not already been described in greater detail, the following are some of the materials which come into consideration as the components referred to in the examples:

can also be used as binder in writing or recording fluids which are based on a solvent other than water, provided that all components are adequately matched.

While specific embodiments of the invention have been described in detail to illustrate the application of the inventive principles, it will be understood that the invention may be embodied otherwise without departing from such principles.

What is claimed is:

1. In a writing or recording fluid on an aqueous basis such as an aqueous ink, wherein the fluid comprises coloring agent, binder, water and, optionally, other additives, the improvement which comprises that it contains as binder a polyurethane which, before it is mixed with other components, is in the form of an aqueous dispersion and wherein the coloring agent comprises pigments which, before they are mixed with the other components, are present as a pigment dispersion or pigment paste.

2. The improvement of claim 1, wherein the polyurethane is a linear polyurethane.

3. The improvement of claim 1, wherein the aqueous polyurethane dispersion contains 30 to 60 weight percent of solid content and has a viscosity of 10 to 200 cP at 20° C., and wherein the pigment dispersion contains 20 to 60 weight percent of pigment.

4. The improvement of claim 1, wherein the aqueous polyurethane dispersion has 35 to 50 weight percent of solid content and a viscosity of 30 to 100 cP at 20° C.

5. The improvement of claim 1, wherein glycols and/or polysaccharides are present as thickeners.

6. The improvement of claim 1, wherein the fluid comprises protein.

7. The improvement of claim 6 wherein the protein is sodium caseinate.

8. The improvement of claim 1, wherein the fluid comprises aliphatic and/or aromatic alcohols, ketones and/or esters.

9. The improvement of claim 1, wherein the fluid comprises an UV absorber.

10. The improvement of claim 1, wherein the fluid comprises soluble coloring agent.

11. The improvement of claim 10, wherein the soluble coloring agent is an acidic dye.

12. An ink comprising 3 to 40 weight percent of polyurethane as binder; 2 to 40 weight percent of coloring agent; 25 to 90 weight percent of water; up to 15 weight percent of alcohols, ketones and/or esters, as well as up to 35 weight percent of proteins, glycols, UV absorber, and/or other additives.

* * * * *